US012774247B2

(12) United States Patent
Watanabe et al.

(10) Patent No.: US 12,774,247 B2
(45) Date of Patent: Oct. 27, 2026

(54) METHOD FOR MANUFACTURING OPTICAL FIBER

(71) Applicant: SUMITOMO ELECTRIC INDUSTRIES, LTD., Osaka (JP)

(72) Inventors: Yudai Watanabe, Osaka (JP); Takahiro Nomura, Osaka (JP); Kazuyuki Sohma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/108,199

(22) Filed: Feb. 10, 2023

(65) Prior Publication Data

US 2023/0257300 A1 Aug. 17, 2023

(30) Foreign Application Priority Data

Feb. 17, 2022 (JP) ................................ 2022-022799

(51) Int. Cl.
*C03C 25/1065* (2018.01)
*G02B 6/02* (2006.01)

(52) U.S. Cl.
CPC ...... *C03C 25/1065* (2013.01); *G02B 6/02395* (2013.01)

(58) Field of Classification Search
CPC ... C03C 25/1065; C03C 25/105; C03C 25/12; G02B 6/02395; B05D 3/067; B05D 1/38; B05D 7/546; B05D 7/586
See application file for complete search history.

(56) References Cited

U.S. PATENT DOCUMENTS

2013/0064516 A1* 3/2013 Nakanishi .......... G02B 6/02395 385/128
2020/0026012 A1* 1/2020 Murata ................ G02B 6/4482
2020/0047378 A1* 2/2020 Iwaguchi ............. G02B 6/4479
(Continued)

FOREIGN PATENT DOCUMENTS

CN 110330501 B * 5/2021 ........... C07D 311/94
JP 2017-065949 A 4/2017
JP 2019064853 A * 4/2019
(Continued)

*Primary Examiner* — Dah-Wei D. Yuan
*Assistant Examiner* — Nga Leung V Law
(74) *Attorney, Agent, or Firm* — Faegre Drinker Biddle & Reath LLP

(57) ABSTRACT

A method for manufacturing an optical fiber includes applying a first resin composition, forming a primary resin layer, applying a second resin composition, and forming a secondary resin layer. An ultraviolet LED used a light source in the forming the primary resin layer and the forming the secondary resin layer. In the forming the primary resin layer, an effective power consumption represented by formula (1) is 0.056 kWs or more and 0.230 kWs or less, $$\sum_{n=1}^{N} Bn \cdot \phi n \cdot tn \quad (1)$$

where N is a number of light sources, Bn [kW] is a rated power of an n-th light source, φn is a predetermined rate of power of the n-th light source, and tn [s] is an irradiation time of the n-th light source.

3 Claims, 2 Drawing Sheets

(56) References Cited

U.S. PATENT DOCUMENTS

2021/0032160 A1 2/2021 Bookbinder et al.

FOREIGN PATENT DOCUMENTS

| | | | |
|---|---|---|---|
| JP | 2021-534069 A | 12/2021 | |
| JP | 2022-514475 A | 2/2022 | |
| WO | 2020/041033 A1 | 2/2020 | |
| WO | 2020/123190 A1 | 6/2020 | |
| WO | WO-2020234268 A1 * | 11/2020 | ............. B05D 3/067 |

* cited by examiner

METHOD FOR MANUFACTURING OPTICAL FIBER

TECHNICAL FIELD

The present disclosure relates to a method for manufacturing an optical fiber.

The present application claims priority to Japanese Patent Application No. 2022-022799 filed on Feb. 17, 2022, the content of which is relied upon and incorporated herein by reference in its entirety.

BACKGROUND

Japanese Unexamined Patent Publication No. 2017-65949 discloses a method for manufacturing an optical fiber. This method for manufacturing an optical fiber includes applying an ultraviolet curable resin to a bare optical fiber and irradiating the optical fiber with ultraviolet light using a semiconductor light emitting element. An ultraviolet LED is used as the semiconductor light emitting element.

SUMMARY

A method for manufacturing an optical fiber according to an aspect of the present disclosure is a method for manufacturing an optical fiber including a glass fiber, a primary resin layer coating an outer circumference of the glass fiber, and a secondary resin layer coating an outer circumference of the primary resin layer. The method for manufacturing an optical fiber includes: applying an ultraviolet curable first resin composition to be the primary resin layer; forming the primary resin layer by curing the first resin composition by irradiation with ultraviolet light; applying an ultraviolet curable second resin composition to be the secondary resin layer; and forming the secondary resin layer by curing the second resin composition by irradiation with ultraviolet light. An ultraviolet LED is used a light source in the forming the primary resin layer and the forming the secondary resin layer. In the forming the primary resin layer, an effective power consumption represented by formula (1) is 0.056 kWs or more and 0.230 kWs or less, $$\sum_{n=1}^{N} Bn \cdot \phi n \cdot tn \tag{1}$$

where N is a number of light sources, Bn [kW] is a rated power of an n-th light source, φn is a predetermined rate of power of the n-th light source, and tn [s] is an irradiation time of the n-th light source. Here, n is a natural number up to N. Additionally, φn=1 when the predetermined rate of power of the n-th light source is 100%. The effective power consumption is proportional to the dose of ultraviolet irradiation on the optical fiber.

DETAILED DESCRIPTION

Figure 1:
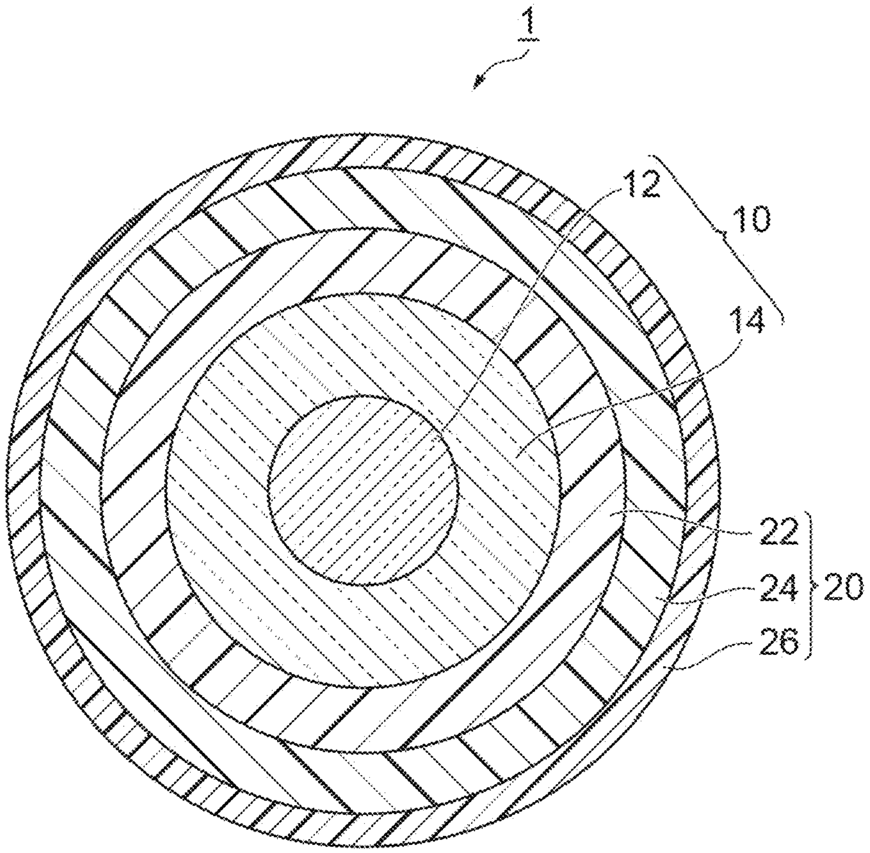
FIG. 1 is a cross-sectional view, perpendicular to an axial direction, of an optical fiber according to a first embodiment.

Problems to be Solved by the Present Disclosure

With growing worldwide environmental awareness, mercury containing lamps that have been conventionally used as a light source for curing ultraviolet curable resin which is an optical fiber coating material are being rapidly replaced by ultraviolet LED. Ultraviolet LED is considered effective in reducing environmental impact since it is mercury-free and is capable of achieving a power saving effect. However, it is necessary to understand the curing reaction of ultraviolet curable resin from the viewpoint of chemical kinetics to maximize its effects. Although such studies have been conducted on resin liquid, film, and the like of ultraviolet curable resin, studies using actual optical fibers have not been conducted.

In particular, insufficient ultraviolet irradiation in the step of forming a primary resin layer may cause the primary resin layer to be re-cured in a later step. This may increase the Young's modulus of the primary resin layer, and increase the microbending loss of the optical fiber.

It is an object of the present disclosure to provide a method for manufacturing an optical fiber that is capable of further enhancing a power saving effect while suppressing an increase in microbending loss.

Advantageous Effects of the Present Disclosure

The present disclosure is capable of providing a method for manufacturing an optical fiber that is capable of further enhancing a power saving effect while suppressing an increase in microbending loss.

Description of Embodiments of the Present Disclosure

Contents of embodiments of the present disclosure will first be listed and described. A method for manufacturing an optical fiber according to an aspect of the present disclosure is a method for manufacturing an optical fiber including a glass fiber, a primary resin layer coating an outer circumference of the glass fiber, and a secondary resin layer coating an outer circumference of the primary resin layer. The method for manufacturing an optical fiber includes: applying an ultraviolet curable first resin composition to be the primary resin layer; forming the primary resin layer by curing the first resin composition by irradiation with ultraviolet light; applying an ultraviolet curable second resin composition to be the secondary resin layer; and forming the secondary resin layer by curing the second resin composition by irradiation with ultraviolet light. An ultraviolet LED is as used a light source in the forming the primary resin layer and the forming the secondary resin layer. In the forming the primary resin layer, an effective power consumption represented by formula (1) is 0.056 kWs or more and 0.230 kWs or less, where N is a number of light sources, Bn [kW] is a rated power of an n-th light source, φn is a predetermined rate of power of the n-th light source, and tn [s] is an irradiation time of the n-th light source.

In this optical fiber, the primary resin layer can be sufficiently cured since the effective power consumption is 0.056 kWs or more in the forming the primary resin layer. This suppresses the re-curing of the primary resin layer in a later step, and the increase in the Young's modulus of the primary resin layer. The power saving effect can be enhanced since the effective power consumption is 0.230 kWs or less.

The method for manufacturing an optical fiber may further include applying an ultraviolet curable third resin composition (colored resin including a pigment, a dye, or the like) to an outer circumference of the secondary resin layer, and forming a colored resin layer by curing the third resin composition by irradiation with ultraviolet light. In this case, since the primary resin layer is sufficiently cured, the re-curing of the primary resin layer and the increase in the Young's modulus of the primary resin layer are suppressed even with further irradiation with ultraviolet light in the forming the colored resin layer. Microbending loss of the optical fiber is thus suppressed.

The forming the primary resin layer may be performed together with the forming the secondary resin layer after the applying the second resin composition. In this case, the primary resin layer and the secondary resin layer can be formed by curing the first resin composition and the second resin composition by irradiating them together with ultraviolet light from the same light source.

The forming the primary resin layer may be performed before the applying the second resin composition. In this case, residual strain (stress) in the primary resin layer is reduced, so that voids do not tend to be generated in the primary resin layer when the optical fiber passes through a capstan.

Details of Embodiments of the Present Disclosure

Specific examples of the method for manufacturing an optical fiber according to this embodiment will be described with reference to the drawings as necessary. The present invention is not limited to these examples, but is defined by the scope of the claims and is intended to include all modifications within the meaning and scope equivalent to the scope of the claims. In the following description, same reference signs are given to the same elements in the description of the drawings, and redundant explanation will be omitted.

(Optical Fiber)

FIG. 1 is a cross-sectional view, perpendicular to an axial direction, of an optical fiber according to the embodiment. An optical fiber 1 is compliant with at least one of the ITU-T G.652 standard, the ITU-T G.654 standard, and the ITU-T G.657 standard. Being compliant with the ITU-T G.652 standard means being compliant with at least one of G.652.A, G.652.B, G.652.C, and G.652.D. Being compliant with the ITU-T G.654 standard means being compliant with at least one of G.654.A, G.654.B, G.654.C, G.654.D, and G.654.E. Being compliant with the ITU-T G.657 standard means being compliant with at least one of G.657.A and G.657.B. The optical fiber 1 includes a glass fiber 10, and a coating resin layer 20 provided on an outer circumference of the glass fiber 10.

The glass fiber 10 includes a core 12 and a cladding 14. The cladding 14 surrounds the core 12. The core 12 and the cladding 14 mainly include glass such as quartz glass. For example, quartz glass doped with germanium or pure quartz glass may be used for the core 12. Pure quartz glass or quartz glass doped with fluorine may be used for the cladding 14. Here, pure quartz glass refers to quartz glass that is substantially free of impurities.

A diameter of the core 12 is 6.0 μm or more and 12.0 μm or less. An outer diameter of the cladding 14 is 125 μm±0.5 μm, that is, 124.5 μm or more and 125.5 μm or less. The outer diameter of the cladding 14 matches a diameter of the glass fiber 10.

The coating resin layer 20 includes a primary resin layer 22, a secondary resin layer 24, and a colored resin layer 26. The primary resin layer 22 is in contact with an outer circumferential surface of the cladding 14, and coats the entire cladding 14. The secondary resin layer 24 is in contact with an outer circumferential surface of the primary resin layer 22, and coats the entire primary resin layer 22. The colored resin layer 26 is in contact with an outer circumferential surface of the secondary resin layer 24, and coats the entire secondary resin layer 24. The colored resin layer 26 constitutes an outermost layer of the coating resin layer 20.

The primary resin layer 22 and the secondary resin layer 24 are formed of a cured product of an ultraviolet curable resin composition. This resin composition includes a urethane (meth)acrylate oligomer, a monomer, and a photopolymerization initiator. Here, the term "(meth)acrylate" refers to the acrylate or the corresponding methacrylate. A monofunctional monomer having a polymerizable group, or a polyfunctional monomer having two or more polymerizable groups may be used as the monomer. Two or more types of monomers may be mixed. The photopolymerization initiator may be selected as appropriate from among publicly known radical photopolymerization initiators. The resin composition may further include a silane coupling agent, a photoacid generator, a leveling agent, an anti-foaming agent, an antioxidant, and the like. The primary resin layer 22 and the secondary resin layer 24 do not include a pigment or a dye, and are almost transparent.

The colored resin layer 26 is formed of a cured product of an ultraviolet curable resin composition including a colored ink (pigment, dye). This resin composition includes, for example, a urethane (meth)acrylate oligomer, a monomer, and a photopolymerization initiator. A monofunctional monomer having a polymerizable group, or a polyfunctional monomer having two or more polymerizable groups may be used as the monomer. Two or more types of monomers may be mixed. The photopolymerization initiator may be selected as appropriate from among publicly known radical photopolymerization initiators. The resin composition may further contain a silane coupling agent, a photoacid generator, a leveling agent, an anti-foaming agent, an antioxidant, and the like. The optical fiber 1 includes the colored resin layer 26, and is thus a so-called optical fiber colored core wire.

A thickness of the primary resin layer 22 is, for example, 7.5 μm or more and 36.5 μm or less. A thickness of the secondary resin layer 24 is, for example, 10 μm or more and 40 μm or less. A thickness of the colored resin layer 26 is, for example, 3 μm or more and 10 μm or less.

A Young's modulus of the primary resin layer 22 is 0.05 MPa or more and 0.60 MPa or less at 23° C. A Young's modulus of the secondary resin layer 24 is 800 MPa or more and 2800 MPa or less at 23° C. A Young's modulus of the colored resin layer 26 is 1000 MPa or more and 1500 MPa or less at 23° C.

(Method for Manufacturing Optical Fiber)

A method for manufacturing the optical fiber 1 according to this embodiment includes a drawing step, a first applying step, a first forming step, a second applying step, a second forming step, a third applying step, and a third forming step. The optical fiber 1 is manufactured by performing each of these steps, which will be described below.

The drawing step is a step of drawing the glass fiber 10 from an optical fiber preform. For example, an optical fiber preform having synthetic quartz as its main component may be used. The optical fiber preform is heated and melted, and extended by an optical fiber drawing machine.

The first applying step is a step of applying an ultraviolet curable resin composition (first resin composition) to be a primary resin layer. The first resin composition is applied on an outer circumferential surface of the glass fiber 10. For example, a die may be used as an application device for applying the first resin composition.

The first forming step is a step of forming the primary resin layer 22 by curing the first resin composition by irradiation with ultraviolet light. The first forming step uses ultraviolet LED as a light source, and irradiates the first resin composition with ultraviolet light. For example, a plurality of the light sources is disposed radially around the glass fiber 10. The first forming step is performed at least after the first applying step. The conditions of ultraviolet irradiation will be described further below.

The second applying step is a step of applying an ultraviolet curable resin composition (second resin composition) to be a secondary resin layer. The second applying step is performed at least after the first applying step. The second applying step may be performed before the first forming step, or after the first forming step. In the case in which the second applying step is performed before the first forming step, the second resin composition is applied to an outer circumferential surface of the first resin composition (wet-on-wet method). In the case in which the second applying step is performed after the first forming step, the second resin composition is applied to the outer circumferential surface of the primary resin layer 22 (wet-on-dry method). For example, a die may be used as an application device for applying the second resin composition.

The second forming step is a step of forming the secondary resin layer 24 by curing the second resin composition by irradiation with ultraviolet light. The second forming step uses ultraviolet LED as a light source, and irradiates the second resin composition with ultraviolet light. For example, a plurality of the light sources is disposed radially around the glass fiber 10. In the wet-on-wet method, the first forming step is performed together with the second forming step after the second applying step. In this case, the first forming step and the second forming step are performed substantially as one step. The primary resin layer 22 and the secondary resin layer 24 are formed by curing the first resin composition and the second resin composition by irradiating them together with ultraviolet light from the same light source. In the wet-on-dry method, the first forming step and the second forming step are performed separately. The first forming step is performed before the second applying step. The second forming step is performed after the second applying step.

The third applying step is a step of applying an ultraviolet curable resin composition (third resin composition) to be the colored resin layer 26. The third resin composition is applied to the outer circumferential surface of the secondary resin layer 24 using a die. The third applying step is performed after the second forming step.

The third forming step is a step of forming the colored resin layer 26 by curing the third resin composition by irradiation with ultraviolet light. The third forming step uses ultraviolet LED as a light source, and irradiates the third resin composition with ultraviolet light. For example, a plurality of the light sources is disposed radially around the glass fiber 10. The third forming step is performed after the third applying step.

Thus, the optical fiber 1 including the glass fiber 10 and the coating resin layer 20 is manufactured and wound onto a bobbin. The fiber before being coated with the colored resin layer 26 may also be referred to as an "element wire," and the fiber after being coated with the colored resin layer 26 may also be referred to as a "core wire." The element wire includes the glass fiber 10, the primary resin layer 22, and the secondary resin layer 24. The core wire is the optical fiber 1. In the method for manufacturing the optical fiber 1, the element wire may be temporarily wound onto a bobbin after the second forming step. In this case, the element wire is drawn from the bobbin, the third applying step and the third forming step are performed, and the core wire is wound onto another bobbin.

(Analysis of Curing Reaction)

The curing reaction of an ultraviolet curable resin is described mainly by the three elementary processes below.

$$\text{Initiation reaction: PI+ultraviolet light } (h\nu)\rightarrow 2\text{R}\cdot \tag{a}$$

$$\text{Propagation reaction: R}\cdot\text{+M}\rightarrow\text{R–M}\cdot \tag{b}$$

$$\text{Termination reaction: R}\cdot\text{+R}\cdot\rightarrow\text{R–R} \tag{c}$$

PI is a photopolymerization initiator, R· is a radical molecule, and M is a monomer or an oligomer. Here, an analysis model focusing on the (a) initiation reaction was created to examine the reaction efficiency and the power saving effect. Typically, when an ultraviolet curable resin is cured, the number of photons of ultraviolet light is in large excess relative to the number of molecules of the photopolymerization initiator. The (a) initiation reaction was thus assumed to be a pseudo first order reaction.

A case in which N light sources are used to cure the ultraviolet curable resin is considered. The effective power consumption is represented by formula (1), $$\sum_{n=1}^{N} Bn\cdot\phi n\cdot tn \tag{1}$$

where Bn [kW] is a rated power of an n-th light source, φn is a predetermined rate of power (illuminance) of the n-th light source, and tn [s] is an irradiation time of the n-th light source. Here, n is a natural number up to N.

C is the ratio of a concentration of the photopolymerization initiator after curing (unreacted concentration of the photopolymerization initiator) to an initial concentration of the photopolymerization initiator. Formula (2) is obtained, assuming the reaction rate constant of the (a) initiation reaction of each light source is constant (=k).

$$\ln C = -k*\sum_{n=1}^{N} Bn\cdot\phi n\cdot tn \tag{2}$$

By plotting ln C against the effective power consumption and approximating the plot by a straight line through the origin, the reaction rate constant k can be obtained from the slope of the approximate straight line. From formula (2), the power consumption required to reduce the ratio of concentration of the photopolymerization initiator to C=1/e (up to 0.37) can be represented as 1/k. This value was used as an indicator of the power saving effect.

(Conditions of Ultraviolet Irradiation)

The ultraviolet irradiation conditions of the first forming step in the manufacturing method according to the embodiment are set. That is, the range of the effective power consumption is set so that k=20 and the ratio C of the concentration of the photopolymerization initiator after curing to the initial concentration of the photopolymerization initiator is 0.010 or more and 0.326 or less in formula (2). The primary resin layer 22 can be sufficiently cured in the first forming step by setting the ratio C to 0.326 or less. This suppresses re-curing of the primary resin layer 22 by ultraviolet irradiation in the third forming step. The rate of change of the Young's modulus of the primary resin layer 22 at 23° C. before and after the third forming step is 50% or less. The increase in the Young's modulus of the primary resin layer 22 in the third forming step is thus suppressed, so that an increase in the microbending loss of the optical fiber 1 is suppressed. Setting the ratio C to 0.010 or more suppresses excessive ultraviolet irradiation and further enhances the power saving effect. The rate of change of the Young's modulus of the primary resin layer 22 at 23° C. is represented by (E2−E1)/E1[%], where E1 is the Young's modulus of the primary resin layer 22 at 23° C. before the third forming step, and E2 is the Young's modulus of the primary resin layer 22 at 23° C. after the third forming step.

(Experiment Example)

An optical fiber preform having synthetic quartz as its main component was heated and melted, and extended by an optical fiber drawing machine so as to have an outer diameter of 125 μm. The first resin composition and the second resin composition were applied, in order, to an outer circumference of the obtained glass fiber using an application device and cured by ultraviolet LED, and the obtained element wire was wound onto a bobbin. The element wire was then drawn from the bobbin, the third resin composition was applied around the element wire by the application device and cured by an ultraviolet lamp, and the obtained core wire (optical fiber) was wound onto another bobbin. Optical fibers of Experiment Examples 1 to 9 were experimentally manufactured by changing the number N of the light sources and the predetermined rate of power φ at a constant linear velocity when forming the element wire. For the photopolymerization initiator of the first resin composition and the second resin composition, 2,4,6-trimethylbenzoyl-diphenyl phosphine oxide (Omnirad TPO manufactured by IGM Resins) (hereinafter, TPO) was used. A photopolymerization initiator different from TPO was used for the third resin composition.

The relationship between the effective power consumption in the first forming step and the rate of change of the Young's modulus of the primary resin layer before and after the formation of the colored resin layer was studied using the optical fibers of Experiment Examples 1 to 9. The Young's modulus of the primary resin layer was measured at 23° C. by the pull-out modulus (POM) technique using an element wire before the formation of the colored resin layer and a core wire after the formation of the colored resin layer. The element wire or the core wire was fixed in two positions with two chucks, and the coating resin layer portion between the two chucks was removed. Here, the coating resin layer portion refers to the primary resin layer and the secondary resin layer in the case of the element wire, and the primary resin layer, the secondary resin layer, and the colored resin layer in the case of the core wire. Subsequently, one of the chucks was fixed, and the other chuck was slowly moved in a direction away from the fixed chuck. The Young's modulus of the primary resin layer was calculated by the following formula, $$\text{Young's modulus [MPa]}=((1+n)W/\pi LZ)\times\ln(Dp/Df)$$

where L is a length of the portion of the element wire or the core wire between the chucks, Z is an amount of movement of the chuck, Dp is an outer diameter of the primary resin layer, Df is an outer diameter of the glass fiber, n is a Poisson's ratio of the primary resin layer, and W is a load during movement of the chuck.

Table 1 illustrates the relationship between the effective power consumption in the first forming step and the rate of change of the Young's modulus of the primary resin layer before and after the formation of the colored resin layer.

TABLE 1

| | Effective power consumption [kWs] | Rate of change of Young's modulus [%] |
|---|---|---|
| Experiment Example 1 | 0.028 | 65 |
| Experiment Example 2 | 0.035 | 60 |
| Experiment Example 3 | 0.056 | 49 |
| Experiment Example 4 | 0.084 | 40 |
| Experiment Example 5 | 0.122 | 33 |
| Experiment Example 6 | 0.165 | 25 |
| Experiment Example 7 | 0.208 | 20 |
| Experiment Example 8 | 0.230 | 18 |
| Experiment Example 9 | 0.260 | 17 |

Figure 2:
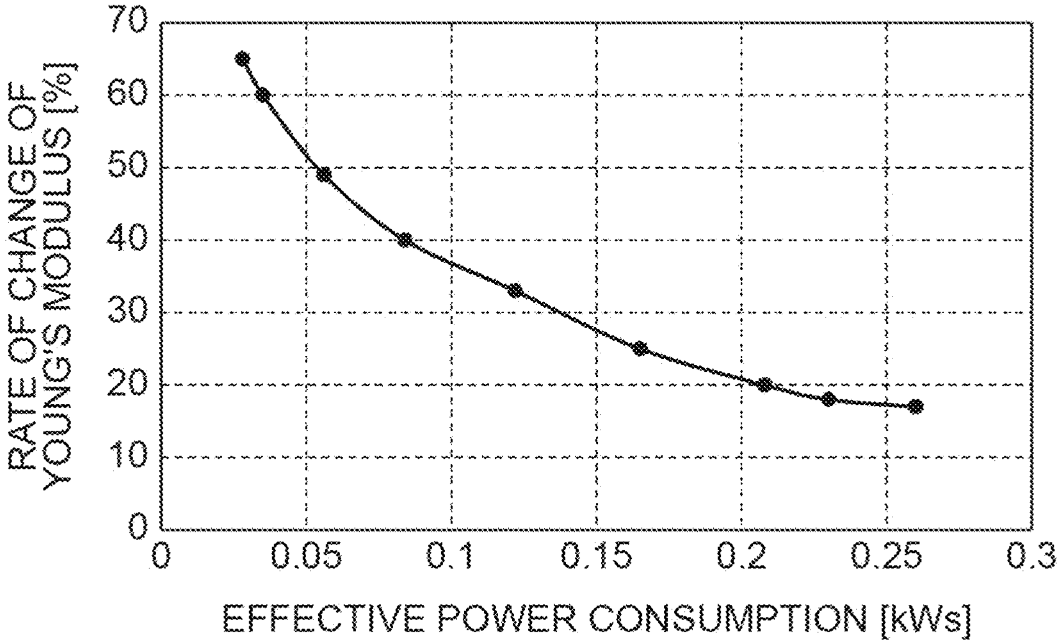
FIG. 2 is a graph plotting the rate of change of the Young's modulus of a primary resin layer before and after formation of a colored resin layer against effective power consumption in a first forming step.

FIG. 2 is a graph plotting the rate of change of the Young's modulus of the primary resin layer before and after the formation of the colored resin layer against the effective power consumption in the first forming step. As illustrated in Table 1 and FIG. 2, the rate of change of the Young's modulus can be suppressed to 50% or less of that before the formation of the colored resin layer by setting the effective power consumption to 0.056 kWs or more. When the effective power consumption exceeds 0.230 kWs, the reduction in the rate of change of the Young's modulus is reduced. The power saving effect can thus be enhanced by setting the effective power consumption to 0.230 kWs or less. The power saving effect can further be enhanced by setting the effective power consumption to 0.208 kWs or less.

Screening tests were performed on the optical fibers (element wires) of Experiment Examples 1 to 9 by rewinding them while pulling them with a tension of 1.5 kg. Thereafter, the transmission loss of the optical fibers with respect to light of a wavelength of 1.3 μm was measured at room temperature. The transmission loss of the optical fibers with respect to light of a wavelength of 1.3 μm was then measured at −60° C. to obtain the increase in the transmission loss. The increase in the transmission loss is represented by α2−α1, where α1 is the transmission loss measured at room temperature, and α2 is the transmission loss measured at −60° C. The increase in the transmission loss was 0.010 dB/km or less for all the optical fibers of Experiment Examples 1 to 9.

The optical fibers of Experiment Examples 3 and 8 were analyzed to examine the residual rate of the photopolymerization initiator remaining in the primary resin layer and the secondary resin layer. Specifically, the TPO concentration in the primary resin layer and the secondary resin layer were measured using an element wire. The TPO concentration was measured as described below. Firstly, remaining molecules included in the coating resin layer to be measured were dissolved into an organic solvent such as acetone or methyl ethyl ketone (MEK). Secondly, the phosphorus concentration included in the TPO was quantitatively measured as the TPO concentration by inductively coupled plasma (ICP) optical emission spectroscopy.

It is known that there is a positive correlation between the residual amount of the photopolymerization initiator in the entire element wire (i.e., the residual rate of the photopolymerization initiator remaining in the primary resin layer and the secondary resin layer) and the rate of increase of the Young's modulus of the primary resin layer before and after the formation of the colored resin layer. The residual amount of the photopolymerization initiator in the entire element wire can thus be an indicator of the rate of increase of the Young's modulus of the primary resin layer before and after the formation of the colored resin layer.

The residual rate of the photopolymerization initiator remaining in the primary resin layer and the secondary resin layer before and after the formation of the colored resin layer was 66% in Experiment Example 3 and 1% in Experiment Example 8.

Although the embodiments have been described, the present disclosure is not necessarily limited to the embodiments and variations described above, and many modifications are possible without departing from the gist thereof.

What is claimed is:

1. A method for manufacturing an optical fiber including a glass fiber, a primary resin layer coating an outer circumference of the glass fiber, and a secondary resin layer coating an outer circumference of the primary resin layer, the method comprising:

applying, to the glass fiber, an ultraviolet curable first resin composition to be the primary resin layer;

forming the primary resin layer by curing the first resin composition by irradiation with ultraviolet light;

applying, to the primary resin layer, an ultraviolet curable second resin composition to be the secondary resin layer;

forming the secondary resin layer by curing the second resin composition by irradiation with ultraviolet light;

applying an ultraviolet curable third resin composition to an outer circumference of the secondary resin layer, and forming a colored resin layer by curing the third resin composition by irradiation with ultraviolet light;

wherein an ultraviolet LED is used as a mercury-free light source in the forming the primary resin layer, the forming the secondary resin layer, and the forming the colored resin layer, wherein, in the forming the primary resin layer, an effective power consumption represented by formula (1) is 0.084 kWs or more and 0.230 kWs or less, $$\sum_{n=1}^{N} Bn \cdot \phi n \cdot tn \tag{1}$$

where N is a number of light sources, Bn is a rated power of an n-th light source, on is a predetermined rate of power of the n-th light source, tn is an irradiation time of the n-th light source, and tn is an irradiation time of the n-th light source, and one of more of Bn, on, and tn are adjusted to maintain the effective power consumption to 0.084 kWs or more and 0.230 kWs or less in the forming the primary resin layer, wherein a rate of change of a Young's modulus of the primary resin layer at 23° C. before and after the forming the colored resin layer is 18% or more when the effective power consumption represented by formula (1) is 0.230 kWs or less and 40% or less when the effective power consumption represented by formula (1) is 0.084 kWs or more, and wherein a Young's modulus of the primary resin layer after the forming the colored resin layer at 23° C. is 0.05 MPa or more and 0.60 MPa or less.

2. The method for manufacturing an optical fiber according to claim 1, wherein the forming the primary resin layer is performed together with the forming the secondary resin layer after the applying the second resin composition.

3. The method for manufacturing an optical fiber according to claim 1, wherein the forming the primary resin layer is performed before the applying the second resin composition.

* * * * *